United States Patent
Kovach

(10) Patent No.: US 12,022,756 B2
(45) Date of Patent: Jul. 2, 2024

(54) ORIENTATION CONTROL SYSTEM FOR AN AGRICULTURAL IMPLEMENT

(71) Applicant: CNH Industrial America LLC, New Holland, PA (US)

(72) Inventor: Michael George Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 759 days.

(21) Appl. No.: 16/830,335

(22) Filed: Mar. 26, 2020

(65) Prior Publication Data
US 2021/0298215 A1    Sep. 30, 2021

(51) Int. Cl.
| | | |
|---|---|---|
| A01B 63/00 | (2006.01) | |
| A01B 49/02 | (2006.01) | |
| A01B 63/22 | (2006.01) | |
| A01B 79/00 | (2006.01) | |
| G01S 13/08 | (2006.01) | |

(Continued)

(52) U.S. Cl.
CPC .......... *A01B 63/008* (2013.01); *A01B 49/027* (2013.01); *A01B 63/22* (2013.01); *A01B 79/005* (2013.01); *G01S 13/08* (2013.01); *G01S 15/08* (2013.01); *G01S 17/08* (2013.01)

(58) Field of Classification Search
CPC ..... A01B 63/008; A01B 63/22; A01B 49/027; A01B 79/005; G01S 13/08; G01S 15/08; G01S 17/08
See application file for complete search history.

(56) References Cited

U.S. PATENT DOCUMENTS

| | | |
|---|---|---|
| 3,642,087 A | 2/1972 | Sampey |
| 4,413,685 A | 11/1983 | Gremelspacher et al. |

(Continued)

FOREIGN PATENT DOCUMENTS

| | | |
|---|---|---|
| CN | 105783839 | 7/2016 |
| CN | 109588075 | 4/2019 |

(Continued)

OTHER PUBLICATIONS

EP Application No. 21165028.8 Extended Search Report, dated Dec. 10, 2021, 13 pgs.

(Continued)

*Primary Examiner* — Tara Mayo
*Assistant Examiner* — Tara Mayo-Pinnock
(74) *Attorney, Agent, or Firm* — Rebecca L. Henkel; Rickard K. DeMille; Peter K. Zacharias

(57) ABSTRACT

An orientation control system for an agricultural implement includes a first sensor configured to be positioned at a forward end portion of a frame of the agricultural implement. The first sensor is configured to emit a first output signal toward a soil surface and to receive a first return signal indicative of a first height of the frame. The orientation control system also includes a second sensor configured to be positioned at a rearward end portion of the frame. The second sensor is configured to emit a second output signal toward the soil surface and to receive a second return signal indicative of a second height of the frame. In addition, the orientation control system includes a controller configured to control a first actuator and a second actuator such that a difference between the first height and the second height is less than a threshold value.

20 Claims, 3 Drawing Sheets

(51) Int. Cl.
  *G01S 15/08* (2006.01)
  *G01S 17/08* (2006.01)

(56) References Cited

U.S. PATENT DOCUMENTS

| | | |
|---|---|---|
| 4,491,183 A | 1/1985 | Anderson et al. |
| 4,679,633 A | 7/1987 | Kauss |
| 4,775,940 A | 10/1988 | Nishida et al. |
| 4,776,153 A | 10/1988 | DePauw et al. |
| 5,060,205 A | 10/1991 | Phelan |
| 5,430,651 A | 7/1995 | Nielsen et al. |
| 5,488,817 A | 2/1996 | Paquet et al. |
| 5,535,577 A | 7/1996 | Chmielewski et al. |
| 5,621,666 A | 4/1997 | O'Neall et al. |
| 5,711,139 A | 1/1998 | Swanson |
| 5,794,421 A | 8/1998 | Maichle |
| 6,076,611 A | 6/2000 | Rozendaal et al. |
| 6,089,327 A | 7/2000 | Kimura et al. |
| 6,131,919 A | 10/2000 | Lee et al. |
| 6,164,385 A | 12/2000 | Buchi |
| 6,216,794 B1 | 4/2001 | Buchi |
| 6,222,628 B1 | 4/2001 | Gorallo et al. |
| 6,305,478 B1 | 10/2001 | Friggstad |
| 6,588,187 B2 | 7/2003 | Englestad et al. |
| 6,698,524 B2 | 3/2004 | Bernhardt et al. |
| 6,813,873 B2 | 11/2004 | Allwörden et al. |
| 6,990,390 B2 | 1/2006 | Groth et al. |
| 7,028,554 B2 | 4/2006 | Adamchuk et al. |
| 7,063,167 B1 | 6/2006 | Staszak et al. |
| 7,540,129 B2 | 6/2009 | Kormann |
| 7,540,130 B2 | 6/2009 | Coers et al. |
| 7,748,264 B2 | 7/2010 | Prem |
| 7,866,671 B2 | 1/2011 | Madler |
| 7,870,709 B2 | 1/2011 | Digman |
| 8,573,319 B1 | 11/2013 | Casper et al. |
| 8,720,170 B2 | 5/2014 | Deneault et al. |
| 8,751,147 B2 | 6/2014 | Colwell |
| 8,752,642 B2 | 6/2014 | Whalen et al. |
| 8,827,001 B2 | 9/2014 | Wendte et al. |
| 8,843,283 B2 | 9/2014 | Strelioff et al. |
| 8,857,530 B2 | 10/2014 | Henry |
| RE45,303 E | 12/2014 | Henry et al. |
| 8,977,441 B2 | 3/2015 | Grimes et al. |
| 9,026,321 B2 | 5/2015 | Henry et al. |
| 9,301,439 B2 | 4/2016 | Gilstring |
| 9,351,443 B2 | 5/2016 | Miller et al. |
| 9,405,039 B2 | 8/2016 | Anderson |
| 9,481,294 B2 | 11/2016 | Sauder et al. |
| 9,510,498 B2 | 12/2016 | Tuttle et al. |
| 9,516,802 B2 | 12/2016 | Zemenchik |
| 9,554,098 B2 | 1/2017 | Casper et al. |
| 9,554,504 B2 | 1/2017 | Houck |
| 9,585,298 B2 | 3/2017 | Henry et al. |
| 9,585,307 B2 | 3/2017 | Holland |
| 9,693,496 B2 | 7/2017 | Tevs et al. |
| 9,706,696 B2 | 7/2017 | Gschwendtner |
| 9,750,174 B2 | 9/2017 | Sauder et al. |
| 9,801,329 B2 | 10/2017 | Zielke |
| 9,861,022 B2 | 1/2018 | Bassett |
| 9,980,422 B2 | 5/2018 | Czapka et al. |
| 10,045,474 B2 | 8/2018 | Bachman et al. |
| 10,104,822 B2 | 10/2018 | Couchman |
| 10,123,475 B2 | 11/2018 | Posselius et al. |
| 10,178,823 B2 | 1/2019 | Kovach et al. |
| 10,219,421 B2 | 3/2019 | Achen et al. |
| 10,820,476 B2 | 11/2020 | Stoller et al. |
| 2010/0017075 A1 | 1/2010 | Beajuot |
| 2012/0227992 A1 | 9/2012 | Henry |
| 2013/0068489 A1 | 3/2013 | Blunier et al. |
| 2016/0029547 A1 | 2/2016 | Casper et al. |
| 2017/0064900 A1 | 3/2017 | Zemenchik |
| 2017/0105331 A1 | 4/2017 | Herlitzius et al. |
| 2017/0251587 A1 | 9/2017 | Sporrer et al. |
| 2018/0114305 A1 | 4/2018 | Strnad et al. |
| 2018/0153088 A1 | 6/2018 | Sporrer et al. |
| 2018/0220577 A1 | 8/2018 | Posselius et al. |
| 2018/0279543 A1 | 10/2018 | Kovach |
| 2018/0299422 A1 | 10/2018 | Pregesbauer |
| 2018/0303022 A1 | 10/2018 | Barrick et al. |
| 2018/0310465 A1 | 11/2018 | Peterson et al. |
| 2018/0310466 A1 | 11/2018 | Kovach et al. |
| 2018/0340845 A1 | 11/2018 | Rhodes et al. |
| 2019/0008088 A1 | 1/2019 | Posselius et al. |
| 2019/0059198 A1 | 2/2019 | Schnaider et al. |
| 2019/0235529 A1 | 8/2019 | Barrick et al. |
| 2019/0246548 A1 | 8/2019 | Kovach et al. |
| 2020/0000005 A1 | 1/2020 | Stanhope et al. |
| 2020/0060062 A1 | 2/2020 | Sporrer et al. |
| 2020/0084954 A1 | 3/2020 | Sporrer et al. |
| 2020/0093052 A1 | 3/2020 | Preimess et al. |
| 2020/0100419 A1 | 4/2020 | Stanhope |
| 2020/0337206 A1 | 10/2020 | Hertzog et al. |
| 2021/0045280 A1 | 2/2021 | Ehlert et al. |
| 2021/0092892 A1 | 4/2021 | Pregesbauer |

FOREIGN PATENT DOCUMENTS

| | | |
|---|---|---|
| EP | 1273216 | 1/2003 |
| JP | H02167004 | 6/1990 |
| JP | 2969808 | 11/1999 |
| JP | H11321634 | 11/1999 |
| JP | 2002165510 | 6/2002 |
| JP | 2005095045 | 4/2005 |
| WO | 2017158006 | 9/2017 |
| WO | WO2017197274 | 11/2017 |
| WO | WO2018018050 | 1/2018 |
| WO | 2019158454 | 8/2019 |

OTHER PUBLICATIONS

EP Application No. 21165022.1, Search Report dated Aug. 6, 2021, 8 pgs.

EP Application No. 21165029.6, Search Report dated Aug. 6, 2021, 7 pgs.

EP Application No. 21165028.8, Search Report dated Aug. 9, 2021, 14 pgs.

EP Application No. 21165025.4, Search Report dated Aug. 6, 2021, 9 pgs.

EP Application No. 19171136.5 Extended European Search Report dated Nov. 6, 2019, 22 pgs.

Gilliot et al., "Soil Surface Roughness Measurement: A New Fully Automatic Photogrammetric Approach Applied To Agricultural Bare Fields," Computers and Electronics in Agriculture, Jan. 23, 2017, pp. 63-78, Elsevier, https://www.researchgate.net/publication/312651105_Soil_surface_roughness_measurement_A_new_fully_automatic_photogrammetric_approach_applied_to_agricultural_bare_fields.

Hart-Carter Co., "Automatic Header Adjustment," Farm Show Magazine, 1984, p. 33, vol. #8, Issue #6.

Raper et al., "A Portable Tillage Profiler for Measuring Subsoiling Disruption," American Society of Agricultural Engineers, 2004, pp. 23-27, vol. 47(1), https://www.ars.usda.gov/ARSUserFiles/60100500/csr/ResearchPubs/raper/raper_04a.pdf.

Yasin et al., "Non-Contact System for Measuring Tillage Depth," Computers and Electronics in Agriculture, 1992, pp. 133-147, https://www.researchgate.net/publication/229318888_Non-contact_system_for_measuring_tillage_depth.

Peteinatos et al., "Precision Harrowing With a Flexible Tine Harrow and an Ultrasonic Sensor," Jul. 2015, Precision Agricultural, pp. 579-586, https://www.researchgate.net/publication/281437517_Precision_harrowing_with_a_lexible_tine_harrow_and_an_ultrasonic_sensor.

"Tiger-Mate® 255 Field Cultivator," 2017, Case IH Agriculture, 24 pgs.

"Ecolo-Tiger® 875 Disk Ripper," 2018, Case IH Agriculture, 16 pgs.

U.S. Appl. No. 16/830,531, filed Mar. 26, 2020, Michael George Kovach.

(56) References Cited

OTHER PUBLICATIONS

U.S. Appl. No. 16/830,331, filed Mar. 26, 2020, Michael George Kovach.
U.S. Appl. No. 16/830,344, filed Mar. 26, 2020, Michael George Kovach.
U.S. Appl. No. 16/830,373, filed Mar. 26, 2020, Michael George Kovach.
U.S. Appl. No. 16/830,410, filed Mar. 26, 2020, Michael George Kovach.

ORIENTATION CONTROL SYSTEM FOR AN AGRICULTURAL IMPLEMENT

BACKGROUND

The present disclosure relates generally to an orientation control system for an agricultural implement.

Certain agricultural implements include ground engaging tools configured to interact with the soil. For example, a tillage implement may include tillage points and/or disc blades configured to break up the soil for subsequent planting or seeding operations. Certain tillage implements extend a significant distance along the direction of travel of the tillage implement. During operation, the tillage implement may become tilted in a fore-aft direction due to variations in the soil surface. Due to the significant length of the tillage implement, the fore-aft tilting may cause the penetration depth of ground engaging tools positioned at the front and rear of the tillage implement to be significantly different than a target penetration depth. As a result, the effectiveness of the tillage operation may be substantially reduced while the tillage implement is tilted in the fore-aft direction.

BRIEF DESCRIPTION

In certain embodiments, an orientation control system for an agricultural implement includes a first sensor configured to be positioned at a forward end portion of a frame of the agricultural implement and directed toward a soil surface. The first sensor is configured to emit a first output signal toward the soil surface and to receive a first return signal indicative of a first height of the forward end portion of the frame above the soil surface. The orientation control system also includes a second sensor configured to be positioned at a rearward end portion of the frame of the agricultural implement and directed toward the soil surface. The second sensor is configured to emit a second output signal toward the soil surface and to receive a second return signal indicative of a second height of the rearward end portion of the frame above the soil surface. In addition, the orientation control system includes a first actuator configured to be coupled to a hitch assembly of the agricultural implement. The first actuator is configured to control a position of a hitch of the hitch assembly relative to the frame along a vertical axis. The orientation control system also includes a second actuator configured to be coupled to a wheel assembly of the agricultural implement. The second actuator is configured to control a position of the wheel assembly relative to the frame along the vertical axis. Furthermore, the orientation control system includes a controller having a memory and a processor. The controller is communicatively coupled to the first sensor, to the second sensor, to the first actuator, and to the second actuator, and the controller is configured to control the first and second actuators such that a difference between the first height and the second height is less than a threshold value.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
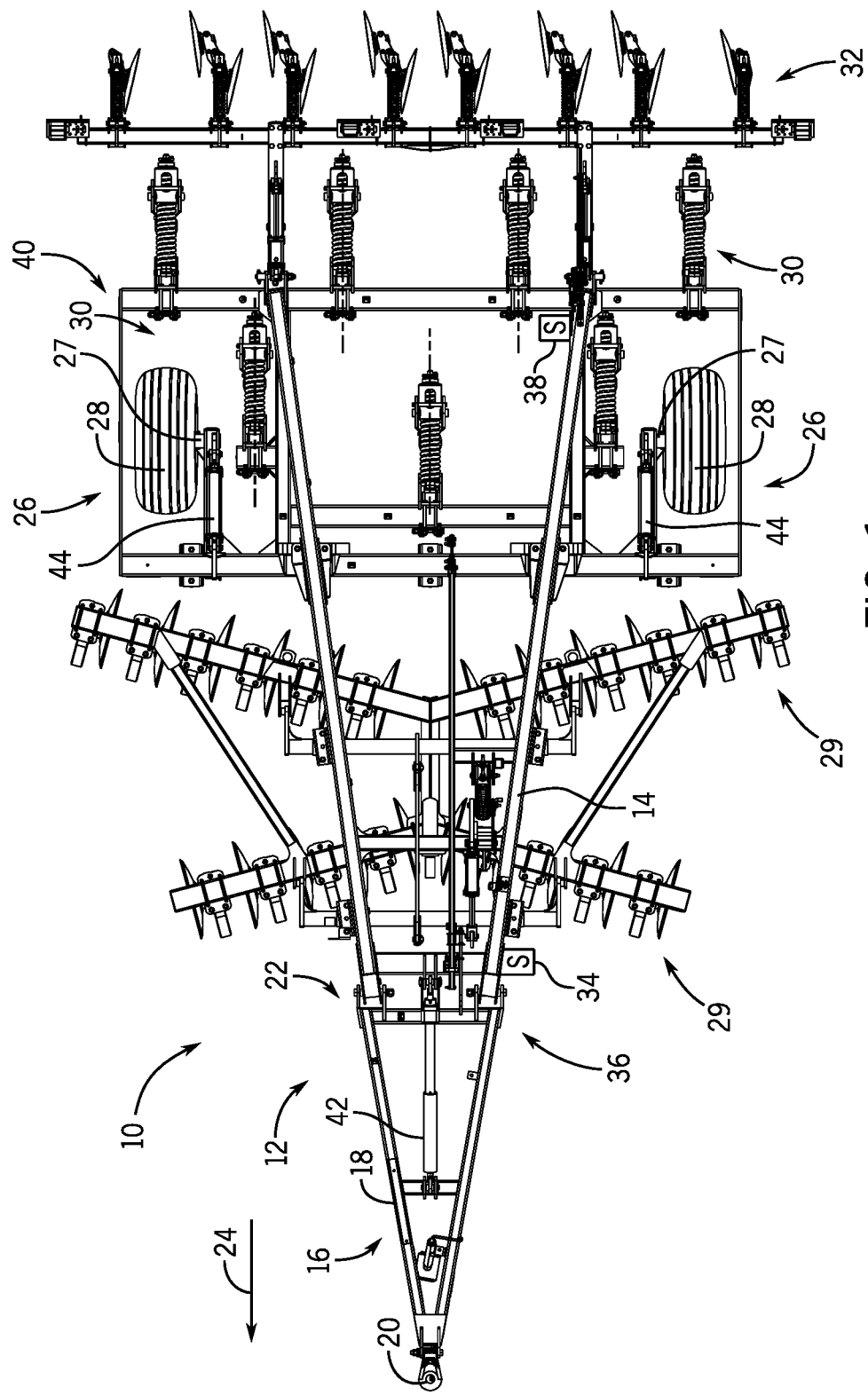
FIG. 1 is a top view of an embodiment of an agricultural implement having an orientation control system.

FIG. 1 is a top view of an embodiment of an agricultural implement 10 having an orientation control system 12. In the illustrated embodiment, the agricultural implement 10 is a primary tillage implement having multiple ground engaging tools configured to till soil. As illustrated, the agricultural implement 10 includes a frame 14 and a hitch assembly 16 coupled to the frame 14. The frame 14 is substantially rigid (e.g., does not include any translatable and/or rotatable components) and formed from multiple frame elements (e.g., rails, tubes, braces, struts, etc.) coupled to one another (e.g., via welded connection(s), via fastener(s), etc.). The hitch assembly 16 includes a hitch frame 18 and a hitch 20. The hitch frame 18 is pivotally coupled to the implement frame 14 via pivot joint(s) 22, and the hitch 20 is configured to couple to a corresponding hitch of a work vehicle (e.g., tractor), which is configured to tow the agricultural implement 10 through a field along a direction of travel 24. While the hitch frame 18 is pivotally coupled to the implement frame 14 in the illustrated embodiment, in other embodiments, the hitch frame may be movably coupled to the implement frame by a linkage assembly (e.g., four bar linkage assembly, etc.) or another suitable assembly/mechanism that enables the hitch to move vertically relative to the implement frame.

As illustrated, the agricultural implement 10 includes wheel assemblies 26 movably coupled to the implement frame 14. In the illustrated embodiment, each wheel assembly 26 includes a wheel frame 27 and a wheel 28 rotatably coupled to the wheel frame 27. The wheels 28 of the wheel assemblies 26 are configured to engage the surface of the soil, and the wheel assemblies 26 are configured to support at least a portion of the weight of the agricultural implement 10. In the illustrated embodiment, each wheel frame 27 is pivotally coupled to the implement frame 14, thereby facilitating adjustment of the vertical position of each wheel 28.

However, in other embodiments, at least one wheel frame may be movably coupled to the implement frame by another suitable connection (e.g., sliding connection, linkage assembly, etc.) that facilitates adjustment of the vertical position of the respective wheel(s). Furthermore, while the agricultural implement includes two wheel assemblies in the illustrated embodiment, in other embodiments, the agricultural implement may include more or fewer wheel assemblies (e.g., 1, 2, 3, 4, 5, 6, or more). In addition, each wheel assembly may include any suitable number of wheels (e.g., 1, 2, 3, 4, 5, 6, or more).

In the illustrated embodiment, the agricultural implement 10 includes ground engaging tools, such as the illustrated disc blades 29, tillage point assemblies 30, and finishing discs 32. The disc blades 29 are configured to engage a top layer of the soil. As the agricultural implement 10 is towed through the field, the disc blades 29 are driven to rotate, thereby breaking up the top layer. In the illustrated embodiment, the disc blades 29 are arranged in two rows. However, in alternative embodiments, the disc blades may be arranged in more or fewer rows (e.g., 1, 2, 3, 4, 5, 6, or more). In addition, the angle of each row relative to the direction of travel 24 may be selected to control the interaction of the disc blades 29 with the top layer of soil. The tillage point assemblies 30 are configured to engage the soil at a greater depth, thereby breaking up a lower layer of the soil. As described in detail below, each tillage point assembly 30 includes a tillage point and a shank. The shank is configured to position the tillage point beneath the soil surface, and the tillage point is configured to break up the soil. The shape of each tillage point, the arrangement of the tillage point assemblies, and the number of tillage point assemblies may be selected to control tillage within the field. Furthermore, as the agricultural implement 10 is towed through the field, the finishing discs 32 are driven to rotate, thereby sizing soil clods, leveling the soil surface, smoothing the soil surface, cutting residue on the soil surface, or a combination thereof.

While the illustrated agricultural implement includes the disc blades 29, the tillage point assemblies 30, and the finishing discs 32, in other embodiments, the agricultural implement may include other and/or additional ground engaging tool(s). For example, the disc blades, the tillage point assemblies, the finishing discs, or a combination thereof, may be omitted in certain embodiments. Furthermore, in certain embodiments, the agricultural implement may include one or more other suitable ground engaging tools, such as coulter(s), opener(s), and tine(s), among other suitable ground engaging tools. Furthermore, while the agricultural implement 10 is a primary tillage implement in the illustrated embodiment, in other embodiments, the agricultural implement may be a vertical tillage implement, another suitable type of tillage implement, a seeding implement, a planting implement, or another suitable type of implement.

In the illustrated embodiment, the agricultural implement 10 includes an orientation control system 12 configured to control a fore-aft orientation of the implement frame 14 (e.g., orientation of the implement along the direction of travel 24). The orientation control system 12 includes a first sensor 34 coupled to a forward end portion 36 of the frame 14 of the agricultural implement 10 relative to the direction of travel 24. The first sensor 34 is directed toward the soil surface, and the first sensor 34 is configured to emit a first output signal toward the soil surface and to receive a first return signal indicative of a first height of the forward end portion 36 of the frame 14 above the soil surface. The orientation control system 12 also includes a second sensor 38 coupled to a rearward end portion 40 of the frame 14 of the agricultural implement 10. The second sensor 38 is directed toward the soil surface, and the second sensor 38 is configured to emit a second output signal toward the soil surface and to receive a second return signal indicative of a second height of the rearward end portion 40 of the frame 14 above the soil surface.

Furthermore, the orientation control system 12 includes a first actuator 42 coupled to the implement frame 14 and to the hitch frame 18 of the hitch assembly 16. The first actuator 42 is configured to control a position of the hitch 20 of the hitch assembly 16 relative to the implement frame 14 along the vertical axis. While the orientation control system 12 includes a single first actuator 42 in the illustrated embodiment, in other embodiments, the orientation control system may include more first actuators extending between the implement frame and the hitch frame. Furthermore, while the first actuator 42 is coupled to the hitch frame 18 in the illustrated embodiment, in other embodiments, the first actuator may be coupled directly to the hitch or another suitable element of the hitch assembly. In addition, the orientation control system 12 includes second actuators 44, in which each second actuator 44 is coupled to the implement frame 14 and to the wheel frame 27 of a respective wheel assembly 26. Each second actuator 44 is configured to control a position of the wheel assembly 26 relative to the implement frame 14 along the vertical axis. For example, each second actuator 44 may control a vertical position of a respective wheel 28 relative to the implement frame 14. While the orientation control system 12 includes two second actuators in the illustrated embodiment, in other embodiments, the orientation control system may include more or fewer second actuators (e.g., one second actuator for each wheel assembly, a single second actuator for both wheel assemblies, etc.).

The orientation control system 12 includes a controller communicatively coupled to the first sensor 34, to the second sensor 38, to the first actuator 42, and to the second actuators 44. The controller is configured to control the first and second actuators such that the difference between the first height and the second height is less than a threshold value. As a result, the implement frame 14 may be substantially maintained at an orientation that is parallel to the soil surface along the fore-aft/longitudinal direction during operation of the agricultural implement (e.g., as compared to an implement frame that is substantially maintained in a level orientation perpendicular to the direction of gravitational acceleration). Accordingly, at least a portion of the ground engaging tools (e.g., all of the ground engaging tools) may be substantially maintained at a target penetration depth beneath the soil surface, thereby enhancing the effectiveness of the agricultural operation (e.g., as compared to an agricultural implement having a frame that tilts relative to the soil surface during operations, thereby causing the penetration depth of the ground engaging tools to vary).

Figure 2:
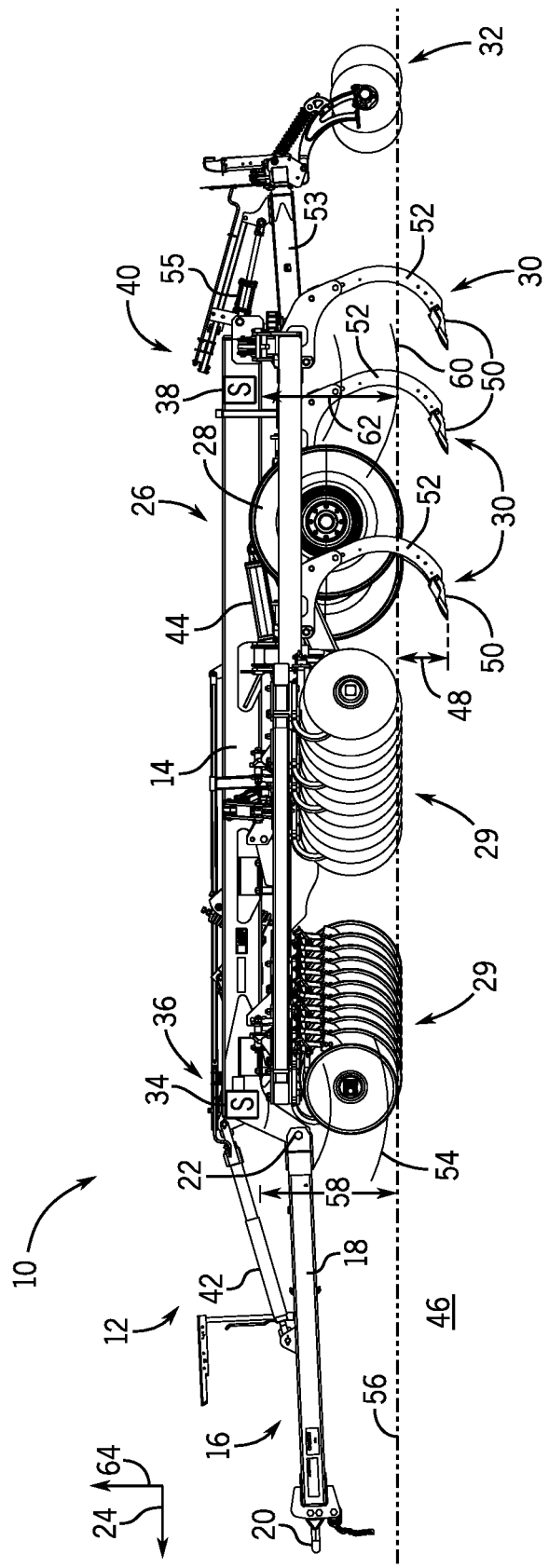
FIG. 2 is a side view of the agricultural implement of FIG. 1.

FIG. 2 is a side view of the agricultural implement 10 of FIG. 1. As previously discussed, the illustrated agricultural implement 10 includes disc blades 29, tillage point assemblies 30, and finishing discs 32. As illustrated, the tillage point assemblies 30 are configured to engage the soil 46 at a greater depth 48 than the disc blades 29, thereby breaking up a lower layer of the soil. Furthermore, as illustrated, each tillage point assembly 30 includes a tillage point 50 and a shank 52. The shank 52 is configured to position the tillage point 50 at the depth 48 beneath the soil surface, and the tillage point 50 is configured to break up the soil 46.

In the illustrated embodiment, the finishing discs 32 are rotatably coupled to a finishing disc frame 53, and the finishing disc frame 53 is pivotally coupled to the implement frame 14. In addition, biasing member(s) 55 extend between the implement frame 14 and the finishing disc frame 53. The biasing member(s) 55 are configured to urge the finishing disc frame 53 toward the surface 56 of the soil 46, thereby driving the finishing discs 32 to engage the soil. While the finishing disc frame is pivotally coupled to the implement frame in the illustrated embodiment, in other embodiments, the finishing disc frame may be movable coupled to the implement frame by a linkage assembly (e.g., four bar linkage assembly, etc.) or another suitable assembly/mechanism that enables the finishing disc frame to move vertically relative to the implement frame. Furthermore, in certain embodiments, the finishing disc frame may be non-translatably and/or non-rotatably coupled to the implement frame, or the finishing disc frame may be omitted, and the finishing discs may be coupled to the implement frame.

In the illustrated embodiment, the first sensor 34 is positioned at a forward end of the forward end portion 36 of the implement frame 14. However, in other embodiments, the first sensor may be positioned at another suitable location within the forward end portion 36. As used herein, "forward end portion" refers to a portion of the total length of the implement frame 14 along the direction of travel 24 that includes the forward end of the implement frame. The portion may include 1 percent, 2 percent, 5 percent, 10 percent, or 15 percent of the total length of the implement frame along the direction of travel 24. Furthermore, in certain embodiments, the first sensor may be mounted to the forward end portion 36 of the implement frame 14 via an extension that positions the first sensor 34 forward of the forward end of the implement frame.

In the illustrated embodiment, the second sensor 38 is positioned at a rearward end of the rearward end portion 40 of the implement frame 14. However, in other embodiments, the second sensor may be positioned at another suitable location within the rearward end portion 40. As used herein, "rearward end portion" refers to a portion of the total length of the implement frame 14 along the direction of travel 24 that includes the rearward end of the implement frame. The portion may include 1 percent, 2 percent, 5 percent, 10 percent, or 15 percent of the total length of the implement frame along the direction of travel 24. Furthermore, in certain embodiments, the second sensor may be mounted to the rearward end portion 40 of the implement frame 14 via an extension that positions the second sensor 38 rearward of the rearward end of the implement frame.

As previously discussed, the first sensor 34 is configured to emit a first output signal 54 toward the surface 56 of the soil 46 and to receive a first return signal indicative of a first height 58 of the forward end portion 36 of the implement frame 14 above the soil surface 56. In addition, the second sensor 38 is configured to emit a second output signal 60 toward the surface 56 of the soil 46 and to receive a second return signal indicative of a second height 62 of the rearward end portion 40 of the implement frame 14 above the soil surface 56. Furthermore, as illustrated, the first actuator 42 is coupled to the implement frame 14 and to the hitch frame 18 of the hitch assembly 16, and the first actuator 42 is configured to control a position of the hitch 20 of the hitch assembly 16 relative to the implement frame 14 along the vertical axis 64. In addition, each second actuator 44 is coupled to the implement frame 14 and to a wheel frame of a respective wheel assembly 26, and each second actuator 44 is configured to control a position of the respective wheel assembly 26 relative to the implement frame along the vertical axis 64. As discussed in detail below, the controller, which is communicatively coupled to the sensors and to the actuators, is configured to control the first and second actuators such that the difference between the first height 58 and the second height 62 is less than a threshold value (e.g., 1 mm, 2 mm, 3 mm, 5 mm, 10 mm, 15 mm, or 20 mm).

In certain embodiments, each second actuator 44 is configured to move the respective wheel(s) 28 from the illustrated raised position to a lowered position. While the wheels 28 are in the lowered position, the ground engaging tools of the agricultural implement 10 are disengaged from the soil 46 (e.g., to facilitate transport and/or inspection of the agricultural implement 10). The second actuator(s) 44 may lift the wheels 28 from the lowered position to the illustrated raised position, thereby causing the ground engaging tools to engage the soil 46. Once the ground engaging tools are engaged with the soil 46, the work vehicle may tow the agricultural implement 10 throughout a field.

In certain embodiments, the hitch assembly may be coupled to the wheel assemblies by a mechanical linkage. In such embodiments, the first actuator may control both the position of the hitch and the position of the wheel assemblies along the vertical axis. In addition, the second actuators may extend from the mechanical linkage to the respective wheel assemblies. Accordingly, the controller is configured to control the first and second actuators to control the first and second heights of the implement frame. Furthermore, in certain embodiments, the first actuator may be omitted, and the hitch frame may freely move (e.g., rotate) relative to the implement frame. In such embodiments, the agricultural implement may include one or more forward wheel assemblies (e.g., one or more gauge wheel assemblies), and an actuator may extend from the implement frame to each respective forward wheel assembly. The controller may control each wheel actuator to control the first and second heights of the implement frame.

Figure 3:
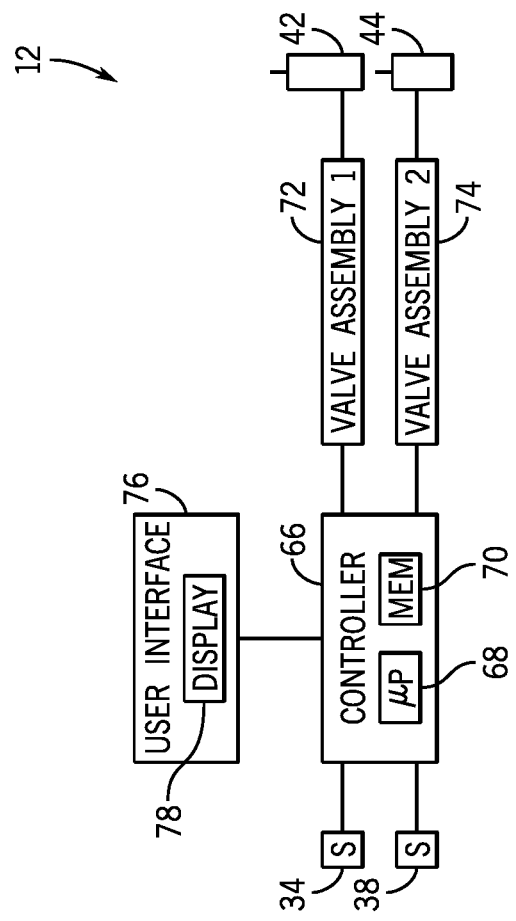
FIG. 3 is a schematic view of an embodiment of an orientation control system that may be employed within the agricultural implement of FIG. 1.

FIG. 3 is a schematic view of an embodiment of an orientation control system 12 that may be employed within the agricultural implement of FIG. 1. In the illustrated embodiment, the orientation control system 12 includes a controller 66 communicatively coupled to the first sensor 34, to the second sensor 38, to the first actuator 42, and to the second actuator 44. The controller 66 is configured to control the first and second actuators such that the difference between the first height of the forward end portion of the implement frame and the second height of the rearward end portion of the implement frame is less than a threshold value. In the illustrated embodiment, the controller 66 is an element of the orientation control system 12 and may be located in/on the agricultural implement. However, in other embodiments, the controller may be located in/on a work vehicle coupled to the agricultural implement. Furthermore, in certain embodiments, one or more functions of the controller may be distributed across multiple control devices (e.g., the control devices forming the controller).

In certain embodiments, the controller 66 is an electronic controller having electrical circuitry configured to control the first and second actuators. In the illustrated embodiment, the controller 66 includes a processor, such as the illustrated microprocessor 68, and a memory device 70. The controller 66 may also include one or more storage devices and/or other suitable components. The processor 68 may be used to execute software, such as software for controlling the first and second actuators, and so forth. Moreover, the processor 68 may include multiple microprocessors, one or more "general-purpose" microprocessors, one or more special-purpose microprocessors, and/or one or more application specific integrated circuits (ASICS), or some combination thereof. For example, the processor 68 may include one or more reduced instruction set (RISC) processors.

The memory device 70 may include a volatile memory, such as random access memory (RAM), and/or a nonvolatile memory, such as read-only memory (ROM). The memory device 70 may store a variety of information and may be used for various purposes. For example, the memory device 70 may store processor-executable instructions (e.g., firmware or software) for the processor 68 to execute, such as instructions for controlling the first and second actuators, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the first and second actuators, etc.), and any other suitable data.

As previously discussed, the first sensor 34 is configured to emit a first output signal toward the soil surface and to receive a first return signal indicative of the first height of the forward end portion of the implement frame above the soil surface. In addition, the second sensor 38 is configured to emit a second output signal toward the soil surface and to receive a second return signal indicative of the second height of the rearward end portion of the implement frame above the soil surface. The first sensor 34 and the second sensor 38 may include any suitable type of sensor configured to emit an output signal toward the soil surface and to receive a return signal indicative of a distance between the sensor and the soil surface. In certain embodiments, the first sensor and/or the second sensor may include an infrared sensor configured to emit an infrared signal toward the soil surface and to receive a return infrared signal from the soil surface. Furthermore, in certain embodiments, the first sensor and/or the second sensor may include a radio detection and ranging (RADAR) sensor (e.g., millimeter wave (MMW) scanner, etc.) configured to emit a radio frequency signal toward the soil surface and to receive a return radio frequency signal from the soil surface. In addition, in certain embodiments, the first sensor and/or the second sensor may include a lidar sensor (e.g., time-of-flight scanning laser, etc.) configured to emit a light signal toward the soil surface and to receive a return light signal from the soil surface. By way of further example, in certain embodiments, the first sensor and/or the second sensor may include an ultrasonic sensor configured to emit an ultrasonic signal toward the soil surface and to receive a return ultrasonic signal from the soil surface. Furthermore, in certain embodiments, the first sensor and/or the second sensor may include a capacitive sensor configured to emit an electric signal/field toward the soil surface and to receive a return electric signal from the soil surface (e.g., in the form of a change to the emitted electric signal/field). While the first sensor and the second sensor are non-contact sensors (e.g., configured to emit an output signal and to receive a return signal) in the illustrated embodiment, in other embodiments, the first sensor and/or the second sensor may be contact sensor(s) (e.g., including a ground contact element) configured to monitor the height of the respective end portion(s) of the frame above the soil surface.

In the illustrated embodiment, the first actuator 42 includes a hydraulic cylinder configured to control the position of the hitch of the hitch assembly relative to the implement frame along the vertical axis. In addition, the orientation control system 12 includes a first valve assembly 72 configured to control a flow of fluid (e.g., hydraulic fluid) to the first actuator 42/hydraulic cylinder. Accordingly, the controller 66 is communicatively coupled to the first actuator 42 via the first valve assembly 72. The first valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the first actuator 42/hydraulic cylinder (e.g., from a fluid source) and, in certain embodiments, from the first actuator 42/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the first actuator 42 includes a single hydraulic cylinder in the illustrated embodiment, in other embodiments, the first actuator may include multiple hydraulic cylinders (e.g., 2, 3, 4, 5, 6, etc.). Furthermore, in certain embodiments, the first actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the second actuator 44 includes a hydraulic cylinder configured to control the position of the respective wheel assembly relative to the implement frame along the vertical axis. In addition, the orientation control system 12 includes a second valve assembly 74 configured to control a flow of fluid (e.g., hydraulic fluid) to the second actuator 44/hydraulic cylinder. Accordingly, the controller 66 is communicatively coupled to the second actuator 44 via the second valve assembly 74. The second valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the second actuator 44/hydraulic cylinder (e.g., from a fluid source) and, in certain embodiments, from the second actuator 44/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the second actuator 44 includes a single hydraulic cylinder in the illustrated embodiment, in other embodiments, the second actuator may include multiple hydraulic cylinders (e.g., 2, 3, 4, 5, 6, etc.). Furthermore, in certain embodiments, the second actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

The controller 66 is configured to control the first and second actuators such that a difference between the first height of the forward end portion of the implement frame above the soil surface and the second height of the rearward end portion of the implement frame above the soil surface is less than a threshold value. As a result, the implement frame may be substantially maintained at an orientation that is parallel to the soil surface along the fore-aft/longitudinal direction during operation of the agricultural implement (e.g., as compared to an implement frame that is substantially maintained in a level orientation perpendicular to the direction of gravitational acceleration). Accordingly, at least a portion of the ground engaging tools (e.g., all of the ground engaging tools) may be substantially maintained at a target penetration depth beneath the soil surface, thereby enhancing the effectiveness of the agricultural operation (e.g., as compared to an agricultural implement having a frame that tilts relative to the soil surface during operations, thereby causing the penetration depth of the ground engaging tools to vary).

Furthermore, in certain embodiments, the controller 66 is configured to control the first and second actuators such that a difference between the first height and a target height is less than a second threshold value, and a difference between the second height and the target height is less than the second threshold value. Accordingly, the target height may be substantially maintained along the length of the implement frame (e.g., along the fore-aft/longitudinal direction). The target height may be selected to establish the target penetration depth of at least a portion of the ground engaging tools (e.g., all of the ground engaging tools) beneath the soil surface. The second threshold value may be any suitable distance, such as 1 mm, 2 mm, 3 mm, 5 mm, 10 mm, 15 mm, or 20 mm. The second threshold value may be the same or different from the first threshold value (e.g., the threshold value associated with the difference between the first height and the second height). For example, the second threshold value may be less than the first threshold value, such that during operation of the agricultural implement, the difference between the first height and the second height may be greater than the difference between each height and the target height (e.g., while the forward end portion of the implement frame is above the target height, and the rearward end portion of the implement frame is below the target height).

In the illustrated embodiment, the orientation control system 12 includes a user interface 76 communicatively coupled to the controller 66. The user interface 76 may include any suitable control(s) configured to enable an operator to interact with (e.g., provide input to, etc.) the orientation control system 12, such as a keyboard, a mouse, one or more switches, one or more buttons, and one or more knobs. For example, the operator may input the first height, the second height, the threshold value(s), other suitable parameters, or a combination thereof, into the user interface. The user interface, in turn, may output signal(s) to the controller indicative of the input values. In the illustrated embodiment, the user interface includes a display 78 configured to present information to the operator. For example, the display 78 may present the first height of the forward end portion of the implement frame above the soil surface, the second height of the rearward end portion of the implement frame above the soil surface, a difference between the first height and the second height, the threshold value(s), other suitable parameters, or a combination thereof. In addition, in certain embodiments, the display may include a touchscreen interface configured to enable an operator to provide input to the controller via the display.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An orientation control system for an agricultural implement, comprising:
a first sensor configured to be positioned at a forward end portion of a frame of the agricultural implement and directed toward a soil surface, wherein the first sensor is configured to emit a first output signal toward the soil surface and to receive a first return signal indicative of a first height of the forward end portion of the frame above the soil surface;
a second sensor configured to be positioned at a rearward end portion of the frame of the agricultural implement and directed toward the soil surface, wherein the second sensor is configured to emit a second output signal toward the soil surface and to receive a second return signal indicative of a second height of the rearward end portion of the frame above the soil surface;
a first actuator configured to be coupled to a hitch assembly of the agricultural implement, wherein the first actuator is configured to control a position of a hitch of the hitch assembly relative to the frame along a vertical axis;
a second actuator configured to be coupled to a wheel assembly of the agricultural implement, wherein the second actuator is configured to control a position of the wheel assembly relative to the frame along the vertical axis; and
a controller comprising a memory and a processor, wherein the controller is communicatively coupled to the first sensor, to the second sensor, to the first actuator, and to the second actuator, and the controller is configured to control the first and second actuators such that a difference between the first height and the second height is less than a threshold value.

2. The orientation control system of claim 1, wherein the first actuator comprises a hydraulic cylinder.

3. The orientation control system of claim 2, comprising a first valve assembly configured to control a flow of fluid to the first actuator, wherein the controller is communicatively coupled to the first actuator via the first valve assembly.

4. The orientation control system of claim 1, wherein the second actuator comprises a hydraulic cylinder.

5. The orientation control system of claim 4, comprising a second valve assembly configured to control a flow of fluid to the second actuator, wherein the controller is communicatively coupled to the second actuator via the second valve assembly.

6. The orientation control system of claim 1, wherein the first sensor comprises an infrared sensor, a radio detection and ranging sensor, a lidar sensor, an ultrasonic sensor, or a capacitive sensor; and wherein the second sensor comprises an infrared sensor, a radio detection and ranging sensor, a lidar sensor, an ultrasonic sensor, or a capacitive sensor.

7. The orientation control system of claim 1, wherein the controller is configured to control the first and second actuators such that a difference between the first height and a target height is less than a second threshold value, and a difference between the second height and the target height is less than the second threshold value.

8. An orientation control system for an agricultural implement, comprising:
a first sensor configured to be positioned at a forward end portion of a frame of the agricultural implement and directed toward a soil surface, wherein the first sensor is configured to emit a first output signal toward the soil surface and to receive a first return signal indicative of a first height of the forward end portion of the frame above the soil surface;
a second sensor configured to be positioned at a rearward end portion of the frame of the agricultural implement and directed toward the soil surface, wherein the second sensor is configured to emit a second output signal toward the soil surface and to receive a second return signal indicative of a second height of the rearward end portion of the frame above the soil surface;
a first actuator configured to be coupled to a hitch assembly of the agricultural implement, wherein the first actuator is configured to control a position of a hitch of the hitch assembly relative to the frame along a vertical axis;
a second actuator configured to be coupled to a wheel assembly of the agricultural implement, wherein the second actuator is configured to control a position of the wheel assembly relative to the frame along the vertical axis; and
a controller comprising a memory and a processor, wherein the controller is communicatively coupled to the first sensor, to the second sensor, to the first actuator, and to the second actuator, and the controller is configured to control the first and second actuators such that a difference between the first height and a target height is less than a threshold value, and a difference between the second height and the target height is less than the threshold value.

9. The orientation control system of claim 8, wherein the first actuator comprises a hydraulic cylinder.

10. The orientation control system of claim 9, comprising a first valve assembly configured to control a flow of fluid to the first actuator, wherein the controller is communicatively coupled to the first actuator via the first valve assembly.

11. The orientation control system of claim 8, wherein the second actuator comprises a hydraulic cylinder.

12. The orientation control system of claim 11, comprising a second valve assembly configured to control a flow of fluid to the second actuator, wherein the controller is communicatively coupled to the second actuator via the second valve assembly.

13. The orientation control system of claim 8, wherein the first sensor comprises an infrared sensor, a radio detection and ranging sensor, a lidar sensor, an ultrasonic sensor, or a capacitive sensor; and
wherein the second sensor comprises an infrared sensor, a radio detection and ranging sensor, a lidar sensor, an ultrasonic sensor, or a capacitive sensor.

14. An agricultural implement, comprising:
a frame configured to support a plurality of ground engaging tools;
a wheel assembly movably coupled to the frame;
a hitch assembly movably coupled to the frame, wherein the hitch assembly comprises a hitch configured to engage a corresponding hitch of a work vehicle;
an orientation control system, comprising:
a first sensor coupled to a forward end portion of the frame and directed toward a soil surface, wherein the first sensor is configured to emit a first output signal toward the soil surface and to receive a first return signal indicative of a first height of the forward end portion of the frame above the soil surface;
a second sensor coupled to a rearward end portion of the frame and directed toward the soil surface, wherein the second sensor is configured to emit a second output signal toward the soil surface and to receive a second return signal indicative of a second height of the rearward end portion of the frame above the soil surface;
a first actuator coupled to the hitch assembly, wherein the first actuator is configured to control a position of the hitch of the hitch assembly relative to the frame along a vertical axis;
a second actuator coupled to the wheel assembly, wherein the second actuator is configured to control a position of the wheel assembly relative to the frame along the vertical axis; and
a controller comprising a memory and a processor, wherein the controller is communicatively coupled to the first sensor, to the second sensor, to the first actuator, and to the second actuator, and the controller is configured to control the first and second actuators such that a difference between the first height and the second height is less than a threshold value.

15. The agricultural implement of claim 14, wherein the hitch assembly is pivotally coupled to the frame.

16. The agricultural implement of claim 14, wherein the wheel assembly is pivotally coupled to the frame.

17. The agricultural implement of claim 14, wherein the first actuator comprises a first hydraulic cylinder, and the second actuator comprises a second hydraulic cylinder.

18. The agricultural implement of claim 17, wherein the orientation control system comprises:
a first valve assembly configured to control a first flow of fluid to the first actuator, wherein the controller is communicatively coupled to the first actuator via the first valve assembly; and
a second valve assembly configured to control a second flow of fluid to the second actuator, wherein the controller is communicatively coupled to the second actuator via the second valve assembly.

19. The agricultural implement of claim 14, wherein the first sensor comprises an infrared sensor, a radio detection and ranging sensor, a lidar sensor, an ultrasonic sensor, or a capacitive sensor; and
wherein the second sensor comprises an infrared sensor, a radio detection and ranging sensor, a lidar sensor, an ultrasonic sensor, or a capacitive sensor.

20. The agricultural implement of claim 14, wherein the controller is configured to control the first and second actuators such that a difference between the first height and a target height is less than a second threshold value, and a difference between the second height and the target height is less than the second threshold value.

* * * * *